US006384905B1

(12) United States Patent
Barrows

(10) Patent No.: US 6,384,905 B1
(45) Date of Patent: May 7, 2002

(54) OPTIC FLOW SENSOR WITH FUSED ELEMENTARY MOTION DETECTOR OUTPUTS

(75) Inventor: Geoffrey L. Barrows, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/612,453

(22) Filed: Jul. 7, 2000

(51) Int. Cl.[7] .............................................. G01P 3/36
(52) U.S. Cl. ....................................................... 356/28
(58) Field of Search .................... 356/28, 373; 73/1.41; 702/142

(56) References Cited

U.S. PATENT DOCUMENTS

| | | | |
|---|---|---|---|
| 5,005,082 A | 4/1991 | Zdepski et al. | 358/174 |
| 5,248,873 A | 9/1993 | Allen et al. | 250/208.1 |
| 5,383,014 A | 1/1995 | Nowak et al. | 356/28 |
| 5,561,287 A | 10/1996 | Turner et al. | 250/208.2 |
| 5,708,266 A | 1/1998 | Soshi et al. | 250/231.14 |
| 5,781,648 A | 7/1998 | Sarpeshkov et al. | 382/107 |
| 5,998,780 A | * 12/1999 | Kramer | 250/221 |
| 6,020,953 A | 2/2000 | Barrows | 356/28 |
| 6,023,521 A | 2/2000 | Sarpeshkov et al. | 382/107 |
| 6,028,672 A | 2/2000 | Geng | 356/376 |
| 6,081,605 A | * 6/2000 | Roth et al. | 382/103 |
| 6,194,695 B1 | * 2/2001 | Barrows | 250/208.1 |

OTHER PUBLICATIONS

Choi et al.; A high Precision VSLI Winner–Take–All Circuit For Self–Organizing Neural Network, IEEE J. Solid State Circuits; vol. 28; pp. 576–583, May 1993.

* cited by examiner

Primary Examiner—Thomas H. Tarcza
Assistant Examiner—Deandra M. Hughes
(74) Attorney, Agent, or Firm—John J. Karasek; John Gladstone Mills, III

(57) ABSTRACT

An optic flow sensor is provided which employs a plurality of photoreceptors and which produces a final optic flow signal that is a robust measurement of the optic flow as seen by the photoreceptors. Each array of a plurality of feature detector arrays receives, as input, photoreceptor signals from the receptors and generates a plurality of feature signals based thereon. Each optic flow measuring circuit or algorithm of a plurality of optic flow measuring circuits or algorithms receives, as input, one of the plurality of feature signals. The optic flow measuring circuits or algorithms each generate an optic flow measurement signal so that a plurality of optic flow measurement signals are generated. A fusion circuit or algorithm, which can, e.g., employ a leaky integrator circuit or algorithm, receives, as input, the optic flow measurement signals and generates the final optic flow signal based thereon.

22 Claims, 10 Drawing Sheets

$\{+1\}$ INTENSITY (TRIVIAL)

$\{+1, 0, -1\}$

EDGE DETECTORS $\{+1, 0, 0, -1\}$ $\{-1, +2, -1\}$

MEXICAN HAT DETECTORS $\{+1, -1, -1, +1\}$

OPTIC FLOW SENSOR WITH FUSED ELEMENTARY MOTION DETECTOR OUTPUTS

BACKGROUND OF THE INVENTION

1. Field of the Invention

The invention relates to the field of optical flow measurement or computation and, more particularly, to an optic flow sensor comprising elemental motion detectors, or the equivalent, wherein the detector outputs are fused to produce more robust optic flow measurement.

2. Description of the Related Art

As set forth in my earlier U.S. Pat. No. 6,020,953, the term "optical flow" generally refers to the motion of texture seen by an agent (such as an animal or a robot) as a result of relative motion between the agent and other objects in the environment. It is well known that animals, especially insects, use information from the optical flow for depth perception and to move about in an environment without colliding into obstacles. Robotics and machine vision researchers have borrowed from these ideas in biology to build machine vision systems that successfully use optical flow for depth perception and obstacle avoidance. These successes verify that optical flow can indeed be used for depth perception and obstacle avoidance in real systems. In a "neuromorphic" approach, computations are performed with analog or mixed-mode circuitry which exploit the physical dynamics inherent in VLSI circuitry and often mimic biological structures.

The aforementioned patent, the subject matter of which is hereby incorporated by reference, discloses a novel motion sensing algorithm, now referred to as the competitive feature tracker (CFT) algorithm, which is amenable to implementation in VLSI. Although this algorithm is able to measure optic flow when exposed to real-world textures and, in this regard, is able to measure optic flow when the texture contrast is made significantly lower than that found in nature, the algorithm can still make erroneous measurements especially as the texture contrast becomes lower.

SUMMARY OF THE INVENTION

In accordance with the invention, an optic flow sensor device is provided which significantly reduces errors inherent in prior art optic flow sensor devices and thus produces substantially more robust optic flow measurements. The invention can be used to fuse the outputs of elementary motion detectors of the competitive feature tracker (CFT) type disclosed in U.S. Pat. No. 6,020,953 as well as in connection with other types of prior art elementary motion detectors. Further, while the discussion of the invention which follows focuses on linear measurements, the invention can also be expanded to two dimensions.

In accordance with a first aspect of the invention, an optic flow sensor is provided which comprises: a plurality of photoreceptors, the photoreceptors generating a plurality of photoreceptor signals; a plurality of feature detector arrays, each said feature detector array receiving as input said photoreceptor signals, and each said feature detector array generating a plurality of feature signals; a plurality of optic flow measuring circuits or algorithms, each said optic flow measuring circuit or algorithm receiving as input one said plurality of feature signals, and each said optic flow measuring circuit or algorithm generating an optic flow measurement signal, whereby said plurality of optic flow measuring circuits or algorithms generates a plurality of optic flow measurement signals; and a fusion circuit or algorithm receiving as input said optic flow measurement signals, and generating a final optic flow signal from said optic flow measurement signals, whereby said final optic flow signal is a robust measurement of the optic flow as seen by said photoreceptors.

Preferably, each of said feature detector arrays generates a different feature signal from that generated by the others of said plurality of feature detector arrays.

Advantageously, at least one of said feature detector arrays comprises a plurality of edge detectors, and/or a plurality of second derivative detectors.

Each of said feature detector arrays preferably comprises a plurality of linear feature detectors although as indicated above the invention is applicable to two dimensions as well.

In one preferred embodiment, the fusion circuit or algorithm comprises a leaky integrator circuit or leaky integrator algorithm. In a further preferred embodiment, the fusion circuit or algorithm determines the recent history of the optic flow measurement signals and computes a mean or median based thereon to generate said final optic flow signal. In another preferred embodiment, the fusion circuit or algorithm determines a running average of the optical flow measurement signals to generate said final optic flow signal.

In accordance with a further aspect of the invention, an optic flow sensor is provided which comprises: a plurality of photoreceptors for generating a plurality of photoreceptors signals; a plurality of feature detector arrays, each of said feature detector arrays receiving said photoreceptor signals and each of said feature detector arrays generating a plurality of feature signals based on said photoreceptor signals received thereby, each of said feature detector arrays generating a different feature signal from that generated by the others of said plurality of feature detector arrays; a plurality of optic flow measuring means for receiving said feature signals, each said optic flow measuring means receiving as input one said plurality of feature signals and each said optic flow measuring means generating an optic flow measurement signal based on the variation over time of the respective feature signals received thereby, so that said plurality of optic flow measuring means generates a plurality of optic flow measurement signals; and a fusion means for receiving said optic flow measurement signals and for generating a final optic flow signal based on said optic flow measurement signals received thereby, said feature detector arrays being sufficiently different from one another that said optic flow measurement signals generated by said optic flow measuring means tend to have errors at different times.

As indicated above, the optic flow measuring means can comprise an optic flow measuring circuit or can comprise an optic flow measuring algorithm implemented by a computer.

As in the other aspect of the invention, at least one of said feature detector arrays advantageously comprises a plurality of edge detectors and/or a plurality of second derivative detectors.

Also as above, each of said feature detector arrays preferably comprises a plurality of linear feature detectors, with the proviso noted above.

As with the other aspect of the invention, there are a number of preferred embodiments of the fusion means, and, in this regard, the fusion means can comprise a leaky integrator circuit or leaky integrator algorithm, or a fusion circuit or algorithm which determines the recent history of the optic flow measurement signals and computes a mean or median based thereon to generate the final optic flow signal, or a fusion circuit or algorithm which determines a running average of the optical flow measurement signals to generate the final optic flow signal.

Further features and advantages of the present invention will be set forth in, or apparent from, the detailed description of preferred embodiments thereof which follows.

DESCRIPTION OF THE PREFERRED EMBODIMENTS

Figure 1:
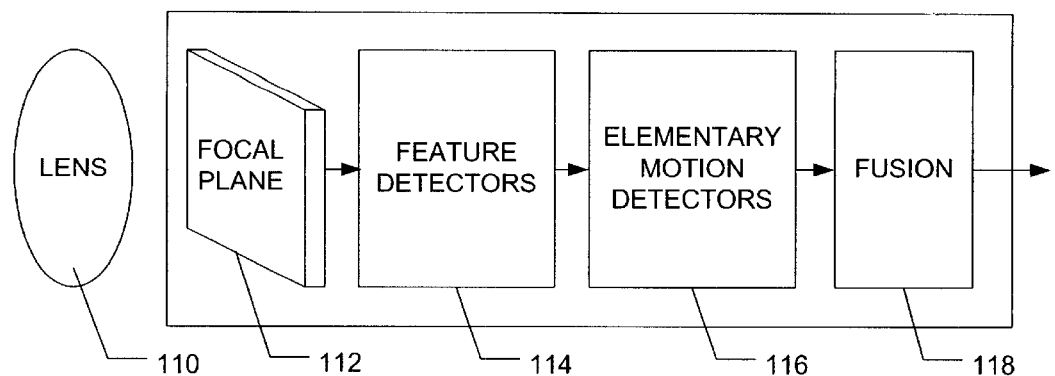
FIG. 1 is a block diagram of the basic integers of an optical flow sensor device in accordance with the invention.

FIG. 1 depicts the overall architecture and basic integers of the optic flow sensor of the invention. It is noted that specific embodiments are discussed below and FIG. 1 is presented to provide initial orientation and background. As illustrated, a lens 110 focuses an image of the environment onto a focal plane chip 112. Chip 112 contains photoreceptor circuits and other front-end circuits necessary to compute optic flow. Low level feature detectors 114 are connected to these photoreceptor circuits and respond to different spatial or temporal primitives in the environment. Elementary motion detectors (EMDs) 116 are connected to the feature detectors 114 and are the most basic structures that sense visual motion. Fusion circuitry 118 fuses information from the EMDs 116 to reduce errors, increase robustness, and produce a meaningful representation of the optic flow for specific applications.

To appreciate the utility of fusion circuitry 118, consider the competitive feature tracker (CFT) architecture described in U.S. Pat. No. 6,020,953 and also described in more detail below. The CFT architecture can be considered an EMD, and, therefore, will be used as a model EMD for the fusion methods described below. The CFT algorithm detects motion by tracking the movement of a feature, such as an edge, across the visual field. The amount of time required for the feature to move between two locations of the focal plane and the direction of movement is used to measure linear optic flow. The algorithm used is able to measure motion when exposed to naturally occurring textures as well as textures whose contrast is on the order of several percent. However, as indicated above, this EMD occasionally makes erroneous measurements and these errors need to be resolved to make the sensor more useful. Although, as discussed below, the invention has broader aspects, in general, the present invention is based in part on the inventive appreciation that if a plurality of these EMDs are placed in the same part of the visual field but each EMD measures motion by tracking a different feature, the different EMDs tend to make mistakes at different times. Thus, if one EMD makes an error, this error is of limited consequence if a majority voting scheme or the like is used to filter out this error. Such a majority voting scheme effectively fuses the EMD outputs to produce a more robust measurement.

Figure 2:
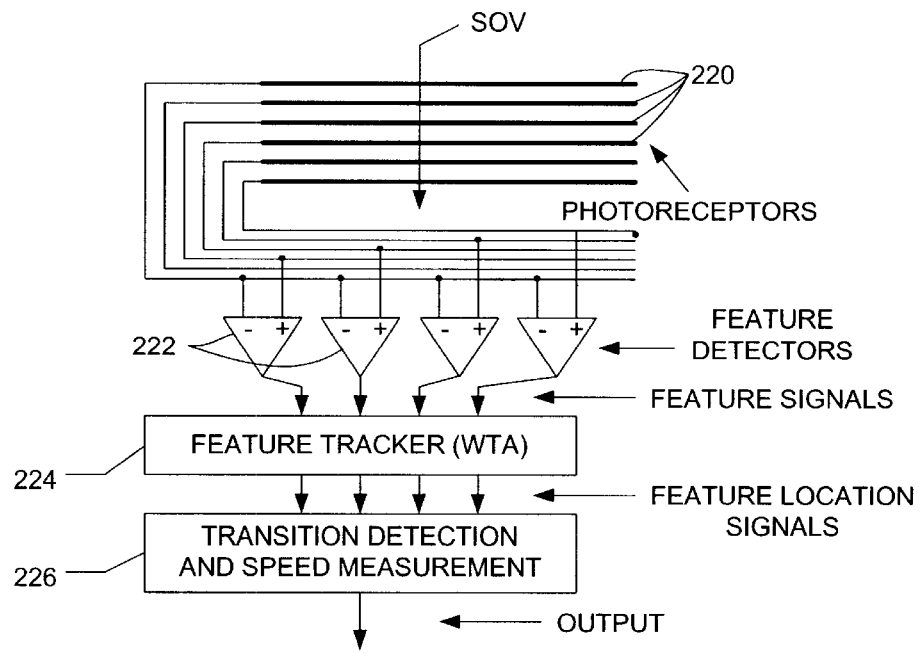
FIG. 2 is a schematic circuit diagram of the basic elements of the prior art optic flow sensor discussed above.

Referring to FIG. 2, a schematic diagram is provided of the basic CFT EMD architecture generally described above and discussed in U.S. Pat. No. 6,020,953. Again, a modified embodiment of this architecture is described in some detail below in connection with FIG. 7. As shown in FIG. 2, the focal plane is sampled with an array of elongated rectangular photoreceptors 220 laid out so that the array is positioned along the sensor orientation vector (SOV) and, in particular, the photoreceptor rectangles are arranged so that their long axes are perpendicular to the SOV. This layout filters out visual information perpendicular to the SOV direction while retaining information in the parallel direction.

The outputs from the photoreceptors 220 are sent to an array of four feature detectors 222 which output four analog feature signals. A feature detector circuit attains its highest output value when the feature to which the feature detector is tuned appears on its input photoreceptors. For example, suppose the feature detectors 222 are differential amplifiers, as shown in FIG. 2. In this case, the effective response function thereof is an edge detection kernel. A feature signal will have a high value when an edge is located between the input photoreceptors 220 with the brighter side on the positively connected photoreceptor.

Figure 3A:
FIGS. 3(a) to 3(e) are circuit diagrams, and include corresponding output signals, of different forms of feature trackers that can be employed in the optic flow sensor device of the invention.
Figure 3A:
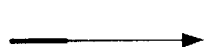
Figure 3B:
Figure 3B:
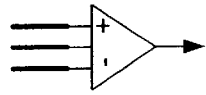
Figure 3C:
Figure 3C:
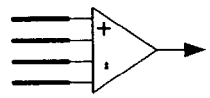
Figure 3D:
Figure 3D:
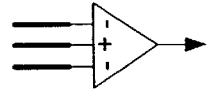
Figure 3E:
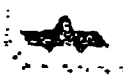
Figure 3E:
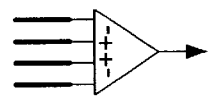

A wide variety of other linear feature detectors can be implemented, including those shown in FIGS. 3(a) to 3(d), and including a "straight wire" (intensity) configuration as shown in FIG. 3(a). An array of weights called the "configuration vector" can be used to describe how the photoreceptor signals are linearly combined. For example, the configuration vector $\{-1, 0, 1\}$ describes the edge detector used in FIG. 2 and FIG. 3(b). A further edge detector shown in FIG. 3(c) implements the configuration vector $\{+1, 0, 0, -1\}$. Another type of feature detector is a second derivative or "linear Mexican hat" detector shown in FIGS. 3(d) and 3(e) implemented by $\{-1, 2, -1\}$ or $\{-1, 1, 1, -1\}$ configurations. Such a feature detector is similar to a one-dimensional difference-of-Gaussian (DOG) filter.

Referring again to FIG. 2, the four analog feature signals are sent to a feature tracker 224. Here a competitive process determines which feature signal has the highest value. This is implemented by a winner take all (WTA) circuit in FIG. 2. In the most basic form thereof, the output is an array of digital signals, with a high value (or "1") for the corresponding input with the most positive signal, and a low value (or "0") for all the others. Thus, as an edge moves across the photoreceptors 220 shown in FIG. 2, the high value will move sequentially across the outputs of the WTA 224.

A transition detection and speed measurement (TDSM) circuit 226 converts the movement of the high WTA output into a velocity measurement. A "valid transition" is defined as a transition directly between lines 2 and 3, i.e., 2→3 and 3→2. All other transitions (e.g., 1→3, and so on) are considered "invalid" and ignored. When valid transitions occur, the duration of the time interval in which the previous WTA output was high (called the "transition interval"), along with the direction of the transition, is given as the output. The optic flow velocity can then be computed from the physical geometry of the photoreceptor array and the sensor optics. It should be noted that this EMD produces a measurement only when a valid transition occurs.

As described above, according to one aspect of the invention, the basic CFT EMD of the prior art is reconfigured to track different features by changing the configuration vector of the feature detectors. In practice, a wide variety of feature detector functions can be used to implement reliable EMDs. As indicated above, each of these EMDs will occasionally make erroneous measurements. It has been observed that EMDs tracking different feature detectors tend to make these errors at different times. (This is not surprising given that different feature detectors effectively transform the focal plane image in different ways.) In accordance with this one aspect of the invention, a plurality of different EMDs are placed in the same part of the visual field, and arranged to share the same photoreceptor array, and the measurements provided by the EMDs are fused to produce a more reliable answer.

As discussed in more detail hereinbelow, several different methods of fusing the EMD outputs can be employed. In one example, a median or a mean is taken over all measurements taken within a time window. Such an approach can be implemented using a von Neumann type of computer or in mixed-mode VLSI. Another approach is to quantize the range of possible speed measurements into B velocity ranges, and then keep track of how many measurements fall within each velocity range over a time period. This determination of which velocity range has received the most stimulus is effectively a majority voting scheme. Alternatively, as described in more detail below, a leaky integrator can be used to record the activity of each velocity range. The use of such velocity ranges allows a sensor to detect multiple optic flow velocities that may result from motion transparency. This, plus the fact that leaky integrators are easily implementable in mixed-mode VLSI, are significant advantages.

Figure 4:
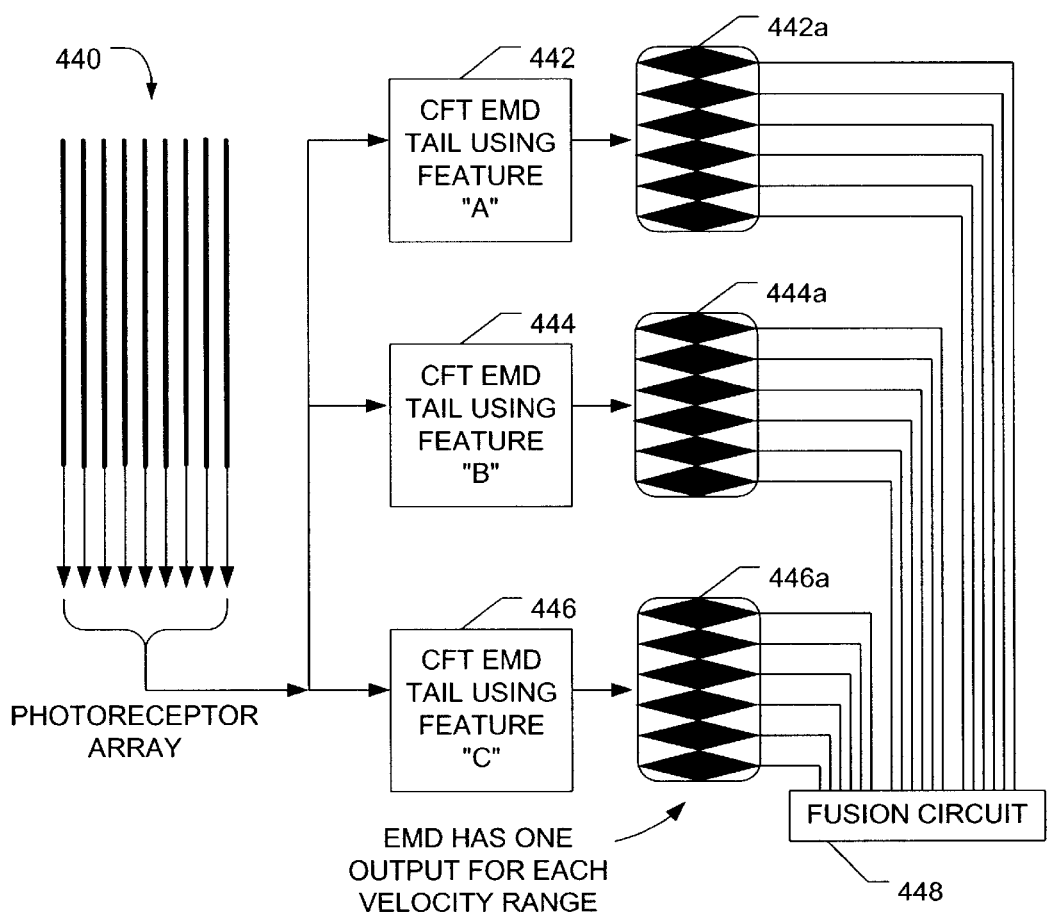
FIG. 4 is a simplified schematic circuit diagram of a flow sensor device in accordance with one embodiment of the invention.

Referring to FIG. 4, a compound sensor is shown for implementing multiple EMDs in one section of the focal plane and then fusing the outputs thereof. A single photoreceptor array 440 is used to sample one region of the visual field. This array provides input to a set of N "EMD tails" 442, 444 and 446 (N=3 in the exemplary embodiment illustrated). An "EMD tail" is defined as the part of the CFT EMD from the feature detectors (detectors 222 in FIG. 2) to the TDSM circuit (TDSM 226 in FIG. 2) and the EMD tails 442, 444 and 446 are connected to corresponding groups of output lines 442a, 444a and 446a. However, the TDSM circuit of each of the EMD tails 442, 444 and 446 is modified to have B output lines for the B velocity ranges. Each velocity range "i" has an associated speed range $[a_i, b_i]$. Whenever the EMD tail experiences a valid transition, the output (or outputs if $\{[a_i, b_i]\}$ are overlapping) corresponding to the appropriate velocity ranges is dependent on the specific application. Thus, the velocity ranges can be wide, narrow, constrained to motion in one direction, or The output lines 442a, 444a and 446a of EMD tails 442, 444 and 446 are connected to a fusion circuit 448 which, in the embodiment under consideration, comprises a set of B leaky integrators for the respective B velocity ranges, and NB charge dump circuits.

Figure 5:
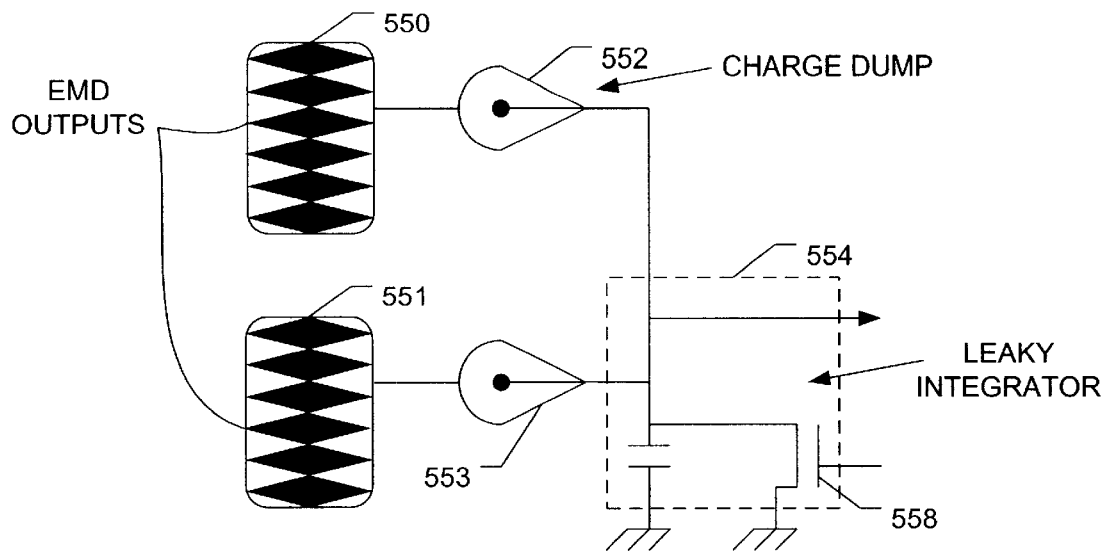
FIG. 5 is a circuit diagram of a leaky integrator used as a fusion circuit in accordance with one embodiment of the invention.

Referring to FIG. 5, a schematic diagram is provided which shows a single leaky integrator 554 which receives input from the output lines 550 and 551 of two EMD tails. Each leaky integrator 554 is, as shown, simply a capacitor 556 connected in parallel with a conductance 558. The conductance 558 causes the potential on capacitor 556 to decay according to some predetermined rate. The EMD tail outputs 550 and 551 are connected to the leaky integrators by charge dump circuits 552 and 553. Each charge dump circuit 552 and 553 deposits a specified amount of charge onto the capacitor 556 every time the dump circuit receives an input pulse. The charge dump circuits 552 and 553 are arranged so that the i'th output of each EMD tail provides stimulus to the i'th leaky integrator. Thus, if the overall sensor is exposed to motion of a certain velocity, then the appropriate leaky integrator will be extensively stimulated by the EMD tails and thereby accumulate a large potential or charge thereon. The other leaky integrators will have either no charge accumulation or a small charge resulting from the occasionally erroneous measurement.

As described in more detail below, the N charge potentials across the leaky integrators are then sent to a winner-take-all (WTA) circuit (not shown) to determine which leaky integrator has the highest potential. Thus, the WTA implements the majority voting scheme described above while the charge dump circuits and the leaky integrators implement the vote-counting method for the majority vote.

Aside from increasing the robustness of optic flow measurements, the fusion approach of the invention has the added benefit of continuously producing an output. In this regard, it will be recalled that the individual EMDs provide outputs only at valid transitions. Thus, unless the EMD output is sampled and/or latched, the output is readable only at specific time intervals. The charge across the leaky integrators, and hence the WTA outputs, are more continuous in time. This eliminates the need for a latch.

The selection of the velocity ranges enables a sensor to be tailored to a particular application. Some applications require optic flow to be measured in one direction only. This choice can be reflected in the selection of velocity ranges. Likewise the velocity ranges can be selected to ignore velocity measurements that are impossible for a particular application. Therefore, such measurements are ignored.

Care must be taken, however, in matching the velocity ranges $\{[a_i, b_i]\}$ to the decay rates of the leaky integrators. Because the CFT EMD reacts a synchronously to texture entities crossing the associated photoreceptors, if the speed is higher then the EMD will experience more valid transitions per unit time and therefore generate output pulses at a higher rate. Thus, the leaky integrators corresponding to higher speeds should have faster decay rates. In practice, it has been found that the intuitive rule of making the leaky integrator decay rate proportional to the solid rate of the velocity range results in a "fair voting" by the WTA. However it is possible to deviate from this rule by a half an order of magnitude and still observe effective fusion of EMD outputs.

Care should also be taken in selecting the velocity range $[\{a_i, b_i\}]$ of the leaky integrators. If the velocity, range sizes are too small, then a single range may not build enough charge to be a clear winner. Similarly, too large a velocity range may yield a measurement too coarse to be practical. Also the values $a_i$ and $b_i$ should increase in a georrietric fashion if the total range of the sensor is significantly larger than an octave. In practice, geometric increases of 1.2 to 2.0 per velocity range have been used. If the selection of velocity ranges is substantially different from these guidelines, then either the strength of the charge dump circuits or the decay rates should be modified so that all leaky integrators "peak out" at the same potential for a given moving texture. Otherwise, some velocity ranges will be favored by the output WTA circuit.

With this background, two preferred embodiments of the optic flow sensor of the invention will now be described which incorporate a fusion algorithm therein. Both of these embodiments use the sensor described previously in U.S. Pat. No. 6,020,953, although, as indicated above, the invention is clearly not limited to that sensor. The description of the two embodiments is based on that of U.S. Pat. No. 6,020,953, and as indicated below, reference may be had to that patent for a more complete description of the sensor per se.

Figure 6:
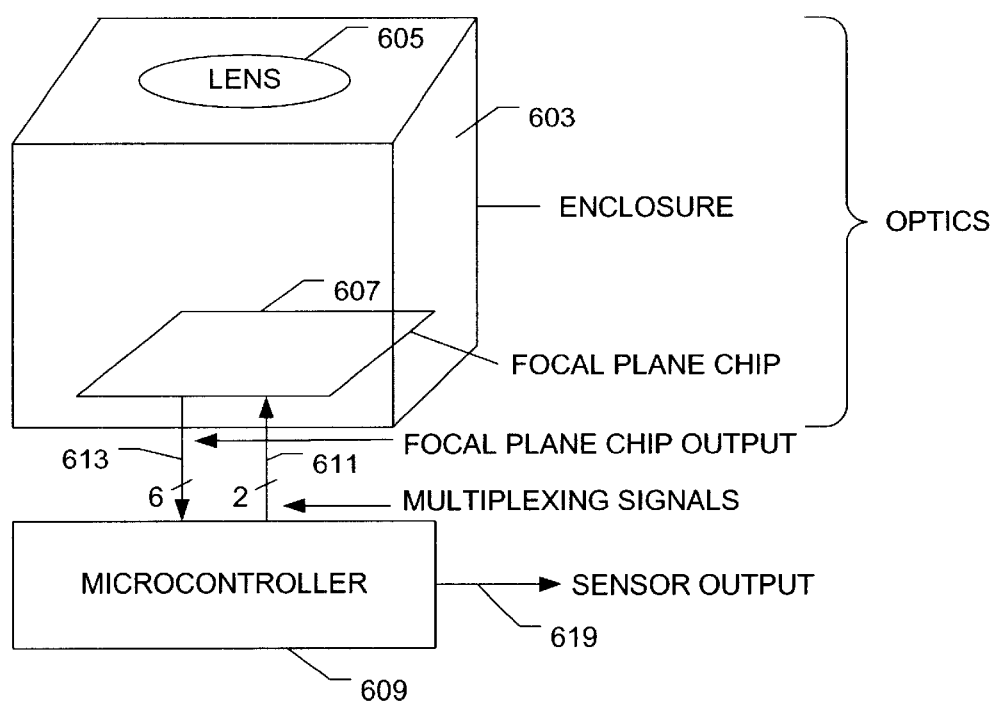
FIG. 6 is a block diagram of the basic integers of a generalized optic flow sensor device in accordance with the invention, used in explanation of a preferred embodiment of the invention.

FIG. 6 depicts in a schematic manner a first preferred embodiment of the invention. In FIG. 6, the overall optics 601 include an enclosure 603 containing a lens 605 and a focal plane chip 607. A microcontroller 609 is connected to focal containing plane chip 607 and multiplexing signals from the microcontroller 609 to the focal plane chip 607 are indicated at 631, while output signals from the focal plane chip 607 to the microcontroller 609 are indicated at 613. The microcontroller 609 produces a sensor output 619.

Figure 7:
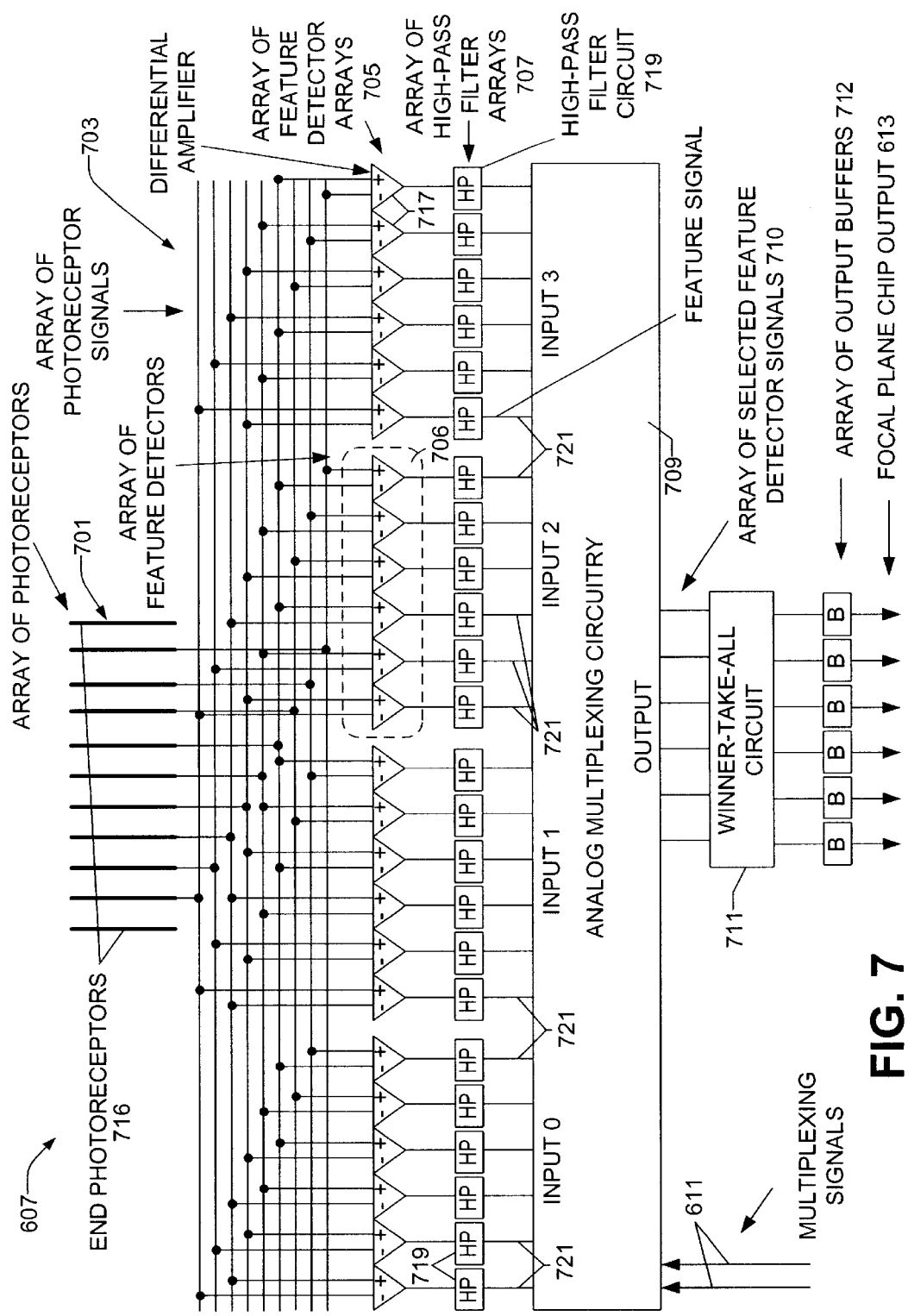
FIG. 7 is a schematic circuit diagram of the focal plane chip of the optic flow sensor of FIG. 6, constructed in accordance with a preferred embodiment of the invention.

Referring to FIG. 7, the construction or contents of the focal plane chip 607 are shown. In the specific embodiment illustrated an array of eleven photoreceptors 701 are connected to nine photoreceptor signal lines 703. Four feature detector arrays 705 are connected to the signal lines 703 as shown, with one of the arrays being denoted 706. Four high-pass filter arrays 707 provide high-pass filtering of the outputs of the feature detector array 705. An analog multiplexing circuit 709 is connected to filter arrays 707 and produces six selected feature signals 710. A winner-take-all circuit 711 receives these signal signals 710 while an array of six output buffers 712 is connected to the output of winner-take-all circuit 711 and produces the focal plane chip output 613 described above. Also shown in FIG. 7 are the multiplexing signals 611 in addition to the focal plane chip output 613. In general, the elements or units shown in FIG. 7 correspond to analogous components described in U.S. Pat. No. 6,020,953, as discussed below.

Each of the eleven photoreceptors 701 can comprise a photoreceptor circuit corresponding to that shown, e.g., in FIGS. 13, 14a and 14b of U.S. Pat. No. 6,020,953. The phototransistors 701 are laid out so that their active areas form an array of elongated rectangles, as indicated above and is described in the patent. As illustrated, the photoreceptor signals from the two end photoreceptors 716 are not used. These end photoreceptors 716 are "dummy circuits" employed to minimize layout and electrical mismatch between the remaining photoreceptors 701.

Each single feature detector array (e.g., that indicated at 706) contains six differential amplifier circuits 717. Each high-pass filter array 707 contains six high-pass filters 719. Each of the differential amplifiers 717 can comprise a five-transistor active-load differential amplifier circuit such as shown in FIG. 15 of U.S. Pat. No. 6,020,953. Similarly, each of the high-pass filter circuits 719 can comprise a continuous-time high-pass filter circuit as shown in FIG. 18 of the patent. In the same manner as described in the patent, the differential amplifiers 717 implement, or function, as edge detectors, while high-pass filters 719 implement, or function, to provide offset cancellation. Therefore, a single feature detector array generates six feature signals 721. (It is noted that this is different from the preferred embodiment described in U.S. Pat. No. 6,020,953, (and that described above in FIG. 2) because in the patent only four feature detectors are used in the preferred embodiment.) As shown in FIG. 7, the preferred embodiment illustrated implements four configurations: {−1,0,1}, {1,0,−1}, {−1,0,0,1}, {1,0,0,−1}. In the following description, the word "configuration" will be used to refer to one of the four arrays of feature detectors and high pass filters.

The analog multiplexing circuit 709 selects six feature signals 721 from one of the feature detector array outputs and generates the six selected feature signals 710. Therefore, the multiplexing signals 611 are two bits wide in this embodiment. The purpose of the multiplexing circuit 709 is to select one of the configurations for output to the winner-take-all circuit 711 and hence to off-chip, i.e., to the chip output 613.

Figure 8A:
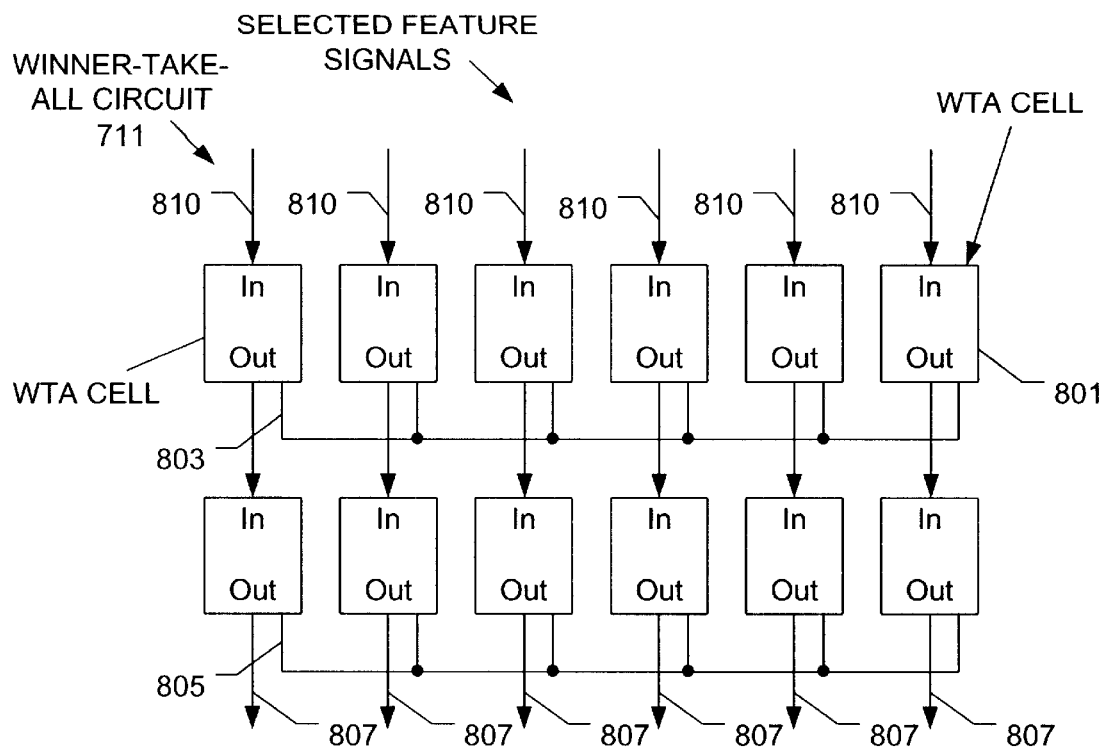
FIG. 8A is a schematic circuit diagram of a preferred embodiment of the winner-take-all circuit employed in the circuit of FIG. 7.
Figure 8B:
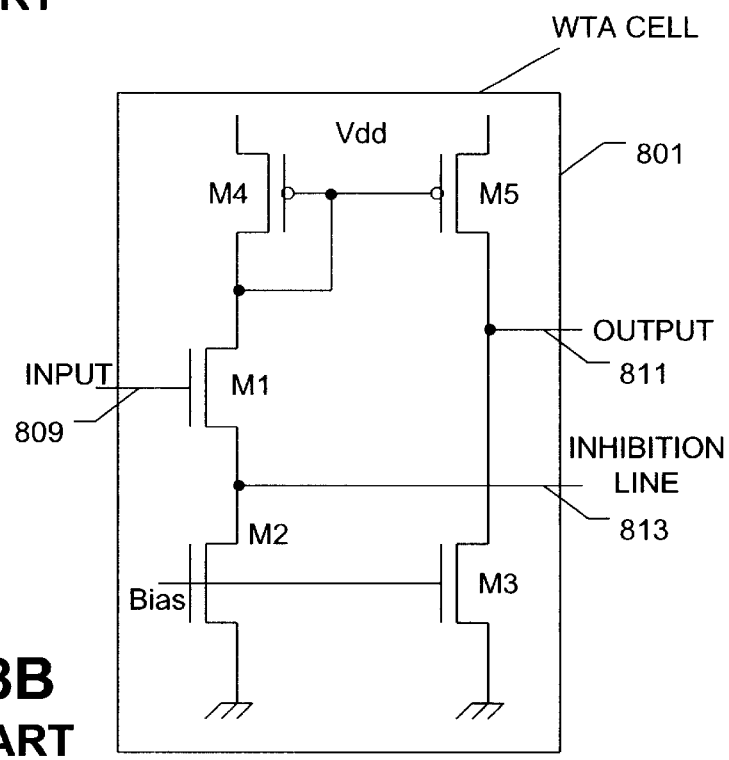
FIG. 8B is a schematic circuit diagram of a preferred embodiment of a cell of the winner-take-all circuit of FIG. 8A.

The winner-take-all circuit 711 can be implemented using the conventional circuit depicted in FIGS. 8A and 8B. Reference is made to J. Choi et al, "A High Precision VSLI Winner-Take-All Circuit for Self-Organizing Neural Network," IEEE J. Solid State Circuits, Vol. 28, pp. 576–83, May 1993, for a further discussion of this circuit. FIG. 8A shows the components or units of the winner-take-all circuit 711 of FIG. 7 and the input and output connections thereof. The selected feature signals 810 form the inputs to twelve winner-take-all cells 801, while two inhibition lines 803 and 805 are connected as shown and the winner-take-all outputs are indicated at 807. FIG. 8B shows the circuit diagram of one WTA cell 801, including its input 809, its output 811, and its inhibition line connection 813. In the embodiment of FIG. 8A, the twelve WTA cells 801 are arranged in two layers of six WTA cells each. Each layer of six WTA cells has its own inhibition line. The WTA circuit 811 receives as its input the six selected feature signals 810, determines which of these values has the highest value, and sets the corresponding output thereof to a digital high and all other outputs to a digital low. It is noted that the WTA circuit 711 essentially corresponds to feature locator circuit described in U.S. Pat. No. 6,020,953, with the difference, however, that the four different feature detector arrays 705 share this WTA circuit 711 via the multiplexer 709.

Figure 9:
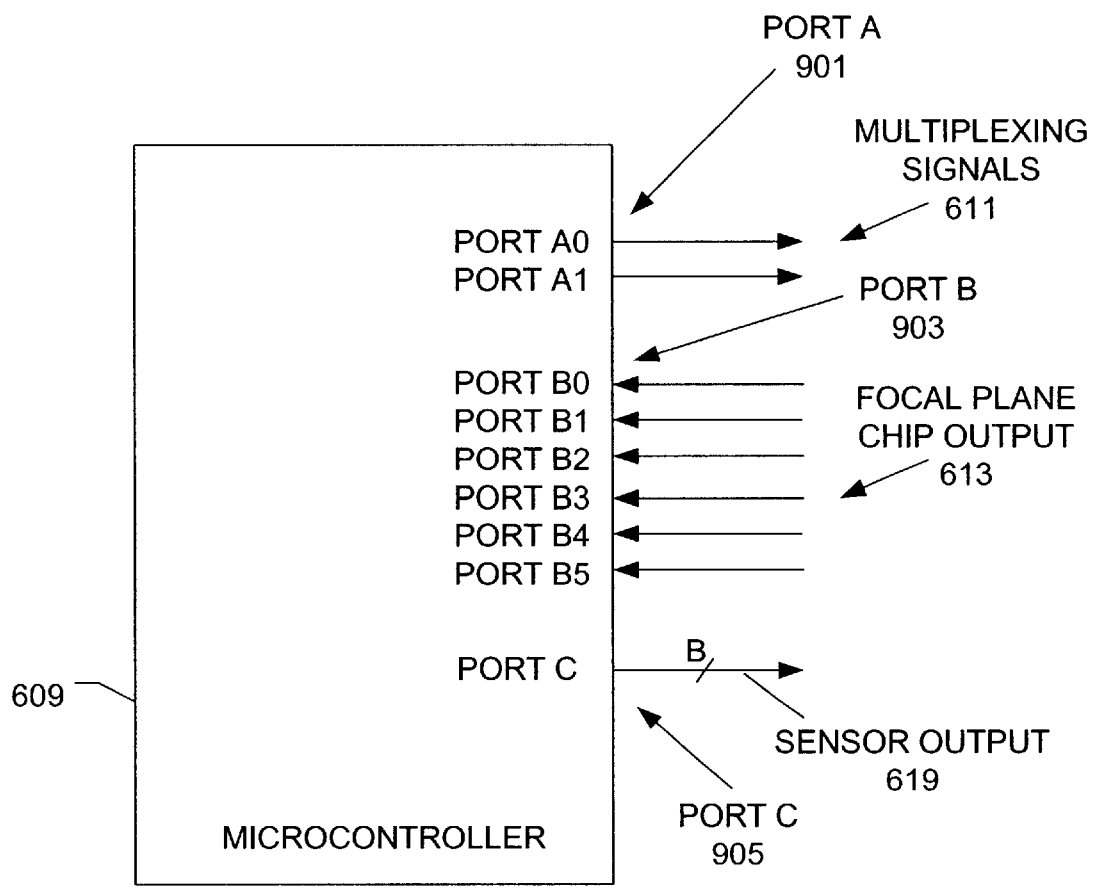
FIG. 9 is a block diagram of a preferred embodiment of the microcontroller of FIG. 6.

FIG. 9 shows microcontroller 609 of FIG. 6 in more detail including the ports providing multiplexing signals 611 and those receiving the focal plane chip output 613. It will be understood that many different microcontrollers could be used to implement microcontroller 709 and the PIC 16c76 microcontroller by Microchip Inc (Chandler, Ariz., USA) is one example. For purposes of discussion, it is assumed that the microcontroller 609 has three ports: PORT A (901), configured as an output port, which is at least two bits wide, PORT B (903), configured as an input port, which is at least six bits wide, and PORT C (905), which is configured as an output port. The two lower bits of PORT A (901) are used to output the multiplexing signals 611. The six lower bits of PORT B (903) receive the focal plane chip output 613. PORT C (905) provides the sensor output 619 and PC)RT C (905) is as wide as is necessary to implement the sensor output.

The algorithm used by the microcontroller 609 will now be described. For each configuration, the algorithm first reads in the focal plane chip output signals 613 via PORT B (903). Variable w(j, i) stores line i when configuration j is selected via the multiplexing signals 611. As indicated above, these focal plane chip signals 613 are equivalent to the feature location signals discussed in U.S. Pat. No. 6,030,953. The algorithm processes the focal plane output signals 613 in time by low-pass filtering and thresholding the signals. The variable x(j, i) represents the low-pass filter version of w(j, i). In this way, if one of the feature location signals corresponding to one configuration changes state for a short time due to noise, this switching or changing of state will be generally ignored. The algorithm then computes an effective pulsed feature location signal, and stores that signal in z(j, i). The effective processed feature location signal is stored in v(j). Next the algorithm implements the transition detection and speed measurement sections of the competitive tracker feature (CFT) algorithm. Finally the algorithm implements fusion with the use of leaky integrators, i.e., circuits corresponding to that shown in FIG. 5 and implemented by a capacitor connected in parallel so that the conductance causes the voltage on the capacitor to decay at some predetermined rate. The leaky integrators are obviously simulated numerically.

The algorithm to be implemented by the microcontroller 609 will be described not as actual "source code", but rather in "pseudocode" format from which it is easy to implement the algorithm. There are two reasons for this: first, the pseudocode format allows a clearer description of the algorithm. A listing of actual source code would be excessively long and would include unimportant details, many of which are pure book-keeping. Second, the pseudocode format allows the algorithm to be ported to other microcontrollers. What follows is first a list of all variables and constants, and second, the pseudocode depicting the algorithm, and third, comments on the code itself.

List of constants:

B=number of velocity ranges (10 in this embodiment)

C=number of configurations (4 in this embodiment)

W=number of feature signals in each configuration, and also the number of lines coming from focal plane chip 613 (6 in this embodiment).

T_MAX=twice the maximum time step which the algorithm is sensitive. This also indicates the slowest speed measured. For this discussion, T_MAX=100.

WTA_ONE=a multiplying factor used in processing the focal plane chip output signals 613

WTA_THRESH=a threshold used in processing the focal plane chip output signals 613. This should be one half of WTA_ONE WTA_ALPHA=an update rate used in processing the focal plane chip output signals.

This should be a negative power of two (i.e., ½, 1/4, 1/8 and so on).

STIMULATION: The amount by which to stimulate a leaky integrator when charge is dumped thereon.

List of tables: It is noted that in an actual program on the microcontroller, all these tables can be implemented as a "jump table." For a one-dimensional table, the subscript (i) denotes the i'th element of the table. For a given two-dimensional table, subscript (j, i) denotes the table entry in the j'th row and i'th column.

OUTPUT_TABLE: A two-dimensional table used to determine if a valid transition occurs, and if so, in which direction. OUTPUT_TABLE (j, i) examines the transition in which the old WTA value (or processed feature location signal) is j and the now one is i. An entry of 1 means that the transition is a valid transition in the positive direction. An entry of −1 means that the transition is a valid transition in the negative direction. An entry of zero means either that the transition is not valid, for example as in (i, j)=(1,4), or that there is no transition, which occurs when i=j.

TIME_TO_BIN: A one-dimensional table that converts a transition interval (stored as 1(j)) to a bin number. This is the array in which a velocity measurement (in the form of a time measurement) is converted to a velocity range index. In this embodiment, TIME_TO_BIN should be twice T_MAX. in theory, the velocity measurement then converted into a velocity range index. However since there is a one-to-one correspondence between transition intervals and velocity measurements, the middle step can be skipped and the time interval can be converted directly into a velocity range index. This table is arranged so that elements 1 through T_MAX contain the velocity ranges for the positive direction, and elements T_MAX+1 through 2*T_MAX contain the velocity ranges for the negative direction. Element 1 refers to the shortest time interval (fastest velocity) in the positive direction, while element T_MAX refers to the longest time interval (slowest velocity) in the positive direction. The second half of this table is arranged in the opposite direction, with element 2*T_MAX referring to the shortest time interval in the negative direction, and element T_MAX+1 referring to the longest time interval in the negative direction. The second half is arranged in the opposite direction so that if T_MAX is set to a power of two, such as 128, then two's complement notation can be used to store the transition interval t(j), with the sign indicating the direction of transition. In this embodiment, velocity range 1 is the fastest in the positive direction, velocity range 5 the slowest in the positive direction, velocity range 6 the slowest in the negative direction, and velocity range 10 the fastest in the negative direction. This arrangement of velocity ranges also allows a two's complement representation.

INCREMENT_TABLE: A two-dimensional table used to determine if the timer t(k) for configuration k is incremented or reset to 1. INCREMENT_TABLE (j, i) indicates what to do when the old WTA is j and the new WTA is i. A table entry will be zero if the timer is to be reset, and will be one if the timer is to be incremented. BIN_ALPHA: A one-dimensional table used to determine how much to decay a velocity range. Allows different velocity ranges to decay at different rates. Just like WTA_ALPHA above, these values can be negative powers of two. As described above, these values should be set so that the decay rate is approximately proportional to the velocity in the velocity range. However, in this embodiment, all decay rates are the same.

List of variables: with each variable is shown the "data type" usable in a microcontroller, described as the minimum number of bits used to represent the variable.

i=index variable (8-bit word)

j=index variable (8-bit word)

b(i)=the charge stored in leaky integrator i (8 or 16-bit word)

o(i)=old WTA value of configuration i (3-bit word)

t(i)=timer value of configuration i. This is used to measure how long the feature location signal has stayed at a current location. When a valid transition occurs, the contents of this variable become the transition interval (8-bit word)

v(i)=current WTA value of configuration i (3-bit word)

m(i)=current measurement of configuration i. When a valid transition occurs, this value stores the index of velocity range to be stimulated. Otherwise it is zero (4-bit word)

w(j, i)=line i of focal plane chip output 313 when the multiplex signals 311 are set to select configuration j. Equivalently, this is feature location signal i of the elementary motion detector j, before processing, or WTA output i when the multiplex signals 311 select configuration j, (1 bit)

x(j, i)=low-pass filter version of w(j, i), used for processing the corresponding focal plane chip output (6-bit word)

ynew(j, i)=current thresholded version of x(j, i). This is equivalently the corresponding processed feature location signal (1 bit)

yold(j, i)=thresholded version of x(j, i) from previous step (1 bit)

z(j, i)=high if and only if ynew(j, i) is high and yold (j, i) is low. (This is equivalently a "pulsed feature location signal" described in U.S. Pat. No. 6,020,953) (1 bit)

v(j)=stores which "pulsed feature location signal" of configuration j fired (was high) most recently (3-bit word)

count=used to count how many loops/iterations since the fusion part was last implemented (8-bit word)

output=which velocity range has the highest charge. This corresponds to a particular velocity, which is computed from the geometries of the photoreceptor array and the optics. This becomes the sensor output 619 (4-bit word)

Turning now to the pseudocode:

```
101   B = 10;
102   T_MAX = 200;
103   C = 4;
104   W = 6;
105   WTA_ONE = 32;
106   WTA_THRESH = 16;
107   WTA_ALPHA = 1/8;
108   For I = 1 to B
109       b(i) = 0
110   end
      // initialize variables
120   for i = 1 to C
121       o(i) = 1;
122       t(i) = 1;
123       v(i) = 1;
124       m(i) = 0;
125       for j = 1 to W
126           w(i, j) = 0;
127           x(i, j) = 0;
128           ynew(i, j) = 0;
129           yold(i, j) = 0;
130           z(i, j) = 0
131       end
132   end
133   count = 0 // count
140   STIMULATION = 20;
141   FUSION_INTERVAL = 20;
142   BIN_ALPHA = [1/8 1/8 1/8 1/8 1/8 1/8 1/8 1/8];
```

143
$$\text{INCREMENT\_TABLE} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}; \quad \text{// identity matrix of size W}$$

144
$$\text{OUTPUT\_TABLE} = \begin{bmatrix} 0 & 0 & 0 & 0 & 0 & 0 \\ -1 & 0 & 1 & 0 & 0 & 0 \\ 0 & -1 & 0 & 1 & 0 & 0 \\ 0 & 0 & -1 & 0 & 1 & 0 \\ 0 & 0 & 0 & -1 & 0 & 1 \\ 0 & 0 & 0 & 0 & 0 & 0 \end{bmatrix};$$

```
145   TIME_TO_BIN =
          [0 1 2 2 3 3 3 ... 5 5 6 6 ... 8 8 8 9 9 10 0];
          // this vector has 2*T_MAX elements and is arranged in a two's complement order
      // main body of code in infinite loop
150   Begin loop
151       For j = 1 to C // loop through configurations
              // first process inputs
152           set PORTA = j // set multiplexing lines
153           for i = 1 to W
154               set w(j, i) = PORTB(i);
155               x(j, i) = x(j, i) + (w(j, i) * WTA_ONE − x(j, i) *
```

```
                WTA_ALPHA;
156                 ynew(j, i) = 1(x(j, i) > WTA_THRESH);
157                 z(j, i) = 1(ynew(j, i) == 1 and yold(j, i) == 0;
                    //function 1(.) means "1 if true, 0 if false"
158                 yold(j, i) = ynew(j, i);
159             end
160             if z(j, 1) == 1 or z(j, 2) == 1 or . . . z(j, W) == 1
161                 v(j) = lowest i in 1 . . . W such that z(j, i) == 1;
162             end
                // now perform CFT algorithm
170             if OUTPUT_TABLE(o(j),v(j)) ! == 0
171                 if OUTPUT_TABLE(o(j),v(j)) == 1
172                     t(j) = T_MAX + 1 − t(j);
173                 end
174                 m(j) = TIME_TO_BIN(t(j));
175                 if m(j) > 0
176                     b(m(j)) = b(m(j)) + STIMULATION;
177                 end
178             end
                // update timer
180             if INCREMENT_TABLE(o(j),v(j)) == 1
181                 t(j) = t(j) + 1;
182             else
183                 t(j) = 1;
184             end
                // store new state
185             o(j) = v(j)
186         end
            // implement fusion
190         count = count + 1;
191         if count > DO_FUSION
192             count = 0;
                // decay
193             for j = 1 to B
194                 if b(j) > 0
195                     b(j) = b(j) − (b(j) * BIN_ALPHA(j) − 1;
196                 end
197             end
                // result
198             output = argmax(b);
                // i.e. find which leaky integrator has the highest potential
                // and return the index of that leaky integrator
199             set PORTC = output
200         end
201     end
```

Turning to the comments on the line numbers set forth above:

- 101–145: These instructions are all dedicated to defining constants and tables, and initializing variables
- 150: This begins an outer loop that runs indefinitely
- 152: Index variable j is used in a loop that cycles through the four configurations
- 152: The multiplex signals 611 are set
- 153–162: The focal plane chip output signals 613 are read in and processed to rate v(j).
- 170–185: The "transition detection and speed measurement" parts are implemented here. Instruction 170 detects to see if a valid transition occurs. Instructions 171–173 determine whether the direction was in the positive or negative, and modifies t(j) accordingly. Instruction 174 determines the velocity range. Instructions 175–177 stimulate the appropriate leaky integrator. Instructions 180–184 update the timer t(j) as appropriate. Whenever any transition occurs, t(j) is reset to 1. Otherwise t(j) is incremented. In this way t(j) determined how long the processed feature location signal is at its current value.
- 193–197: These implement the "leaky" part of the leaky integrator.
- 198–199: These instructions determine which leaky integrator has the highest potential, and hence determine the sensor output.

To briefly summarize this preferred embodiment, the focal plane chip 607 implements four configurations of the optic flow sensor based on the method described in U.S. Pat. No. 6,020,953, from the array of photoreceptors 701 to the winner-take-all circuit 711. The outputs of these four configurations are multiplexed out onto one set of focal plane chip output signals 613, which are effectively feature location signals. The microcontroller 609 then processes the signals 613 to produce a "better" set of feature location signals, and then implements the transition detection and speed measurement part of the algorithm. Fusion of the signals using leaky integrators is also implemented on the microcontroller 609 by numerically simulating the charging and discharging of the leaky integrators.

Turning now to a second preferred embodiment of the invention, in this alternative embodiment, fusion is performed using averaging instead of using leaky integrators. Essentially, every time a valid transition is detected, a measured velocity is computed from the transition interval and a running average is updated. The running average thus becomes the optic flow measurement.

In the specific example under consideration, this alternative embodiment is implemented by making changes to the algorithm set forth above. The implementation of the focal plane chip is maintained the same. The changes in the above algorithm are listed below, with comments in between the changes.

101 Fusalpha=1/16 Fusalpha is an update rate used in the running average. It is best kept as a negative of two.

108 output=0 Output becomes the output of the sensor. Initialize it to zero.

109–110 (delete)

140–142 (delete)

145 TIME_TO_VEL=[0 20 14 10 8 . . . 1 −1 . . . −8 −10 −14 −20 0];

TIME_TO_VEL is a vector that converts signed transition intervals into velocity measurements, and depends on the photoreceptor geometry and optics. As written here, transition intervals of duration one are ignored. The velocity measurement will generally be a reciprocal measurement of the time interval, i.e., velocity=k/time_interval

| | |
|---|---|
| 174 | $m(j) = \text{TIME\_TO\_VEL}(t(j))$; |
| 175 | if $m(j) > 0$ |
| 176 | output = output + $(m(j) - \text{output}) * \text{Fusalpha}$; |
| 177 | end |

The velocity measurement is computed from the time interval, then the running average output is updated.

190 set PORTC=output Here the output is sent to FIORTC.

191–200 (delete)

This alternative embodiment is clearly more simple than that using leaky integrators. However, this alternative embodiment has a disadvantage that if the optic flow measurement changes from one value to the next, the output of the sensor will not jump from the first to the next but will continuously adapt until the new value is obtained.

Having specifically described two preferred embodiments of the invention as well as other alternative embodiments thereof, a description will now be provided of a generalized optic flow sensor using the fusion algorithm of the invention. The sensor will be described in connection with FIG. 10 and, as described below, measures, with increased robustness, the one-dimensional optic flow in one part of the visual field. It will be understood that while the following discussion is limited to one-dimensional optic flow sensors, the same principles can be expanded to two dimensions and that such two dimensional sensors are considered to be within the scope of the invention.

Figure 10:
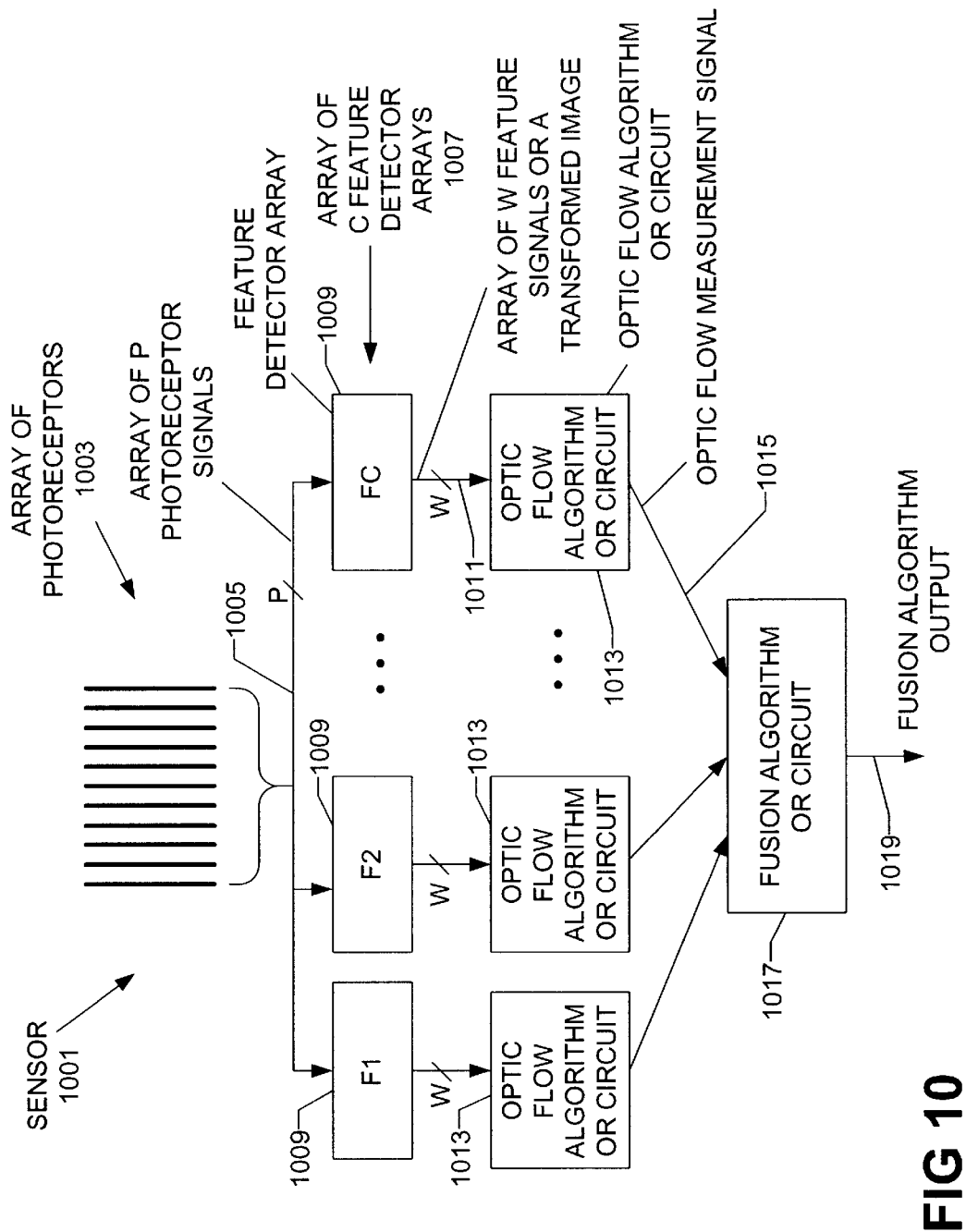
FIG. 10 is a block diagram of a generalized optic flow sensor device constructed in accordance with the invention.

FIG. 10 shows a sensor, generally denoted 1001, which uses a fusion algorithm in accordance with the invention and includes a photoreceptor array 1003 located on the focal plane of an imaging system. A total of P photoreceptors of array 1003 generates P photoreceptor signals denoted 1005. Photoreceptor signals 1005 provide input to an array 1007 of C feature detector arrays 1009. Each of the individual feature detector arrays 1009 (the components of which are discussed below in connection with FIG. 11) generates a plurality of W feature signals 1011, also referred to as a transformed image (a one dimensional image with a width of W pixels). Each of the C feature detector arrays 1009 are different, and thus a total of C transformed images are generated, with each transformed image 1011 being different from the others. Each transformed image 1011 is presented to an optic flow measuring circuit or optic flow measuring algorithm 1013. The circuit or algorithm 1013 generates an optic flow measurement signal 1015 based upon how the transformed image 1011 presented thereto varies over time. The C instances of the optic flow measuring algorithm can be identical algorithms (even though these algorithms process different images) or they can be different optic flow algorithms. The C optic-flow measurement signals 1015 are sent or presented to a fusion algorithm or circuit 1017 which generates a final optic flow measurement 1019. By looking at all the optic flow measurement signals, the fusion algorithm or circuit 1017 is able to identify outliers or erroneous measurements, and thus create an output that is more robust and reliable. As indicated hereinbefore, the method of fusing the optic; flow measurement signals used by the algorithm or circuit 1017 can be relatively simple, e.g., can involve computing a mean or a median based on the recent history of the signals, or can be more complex, as in other embodiments described above.

Figure 11:
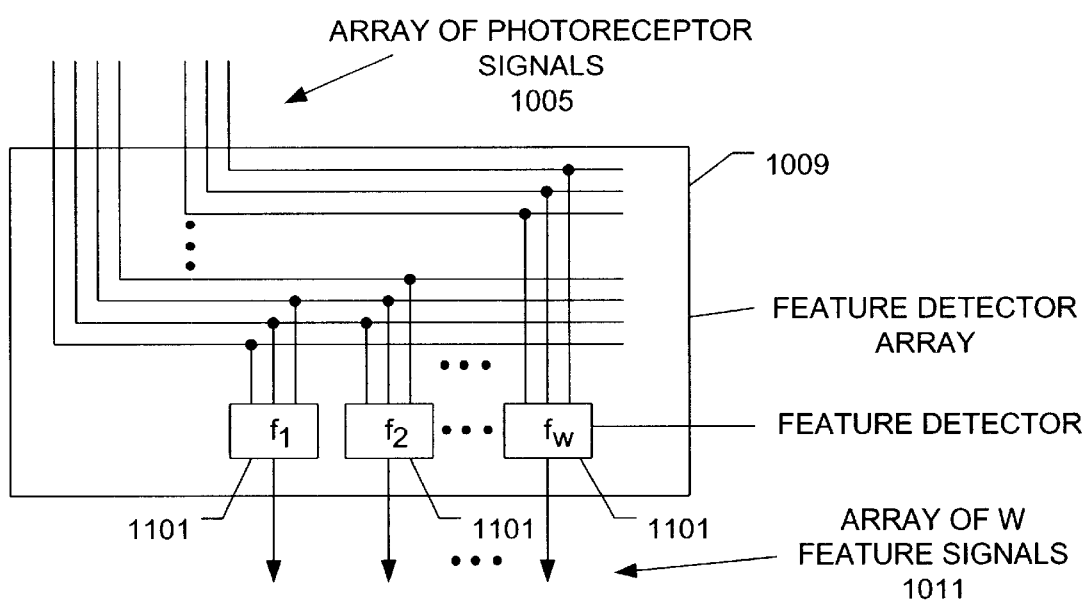
FIG. 11 is a circuit diagram of the feature detector array of the embodiment of FIG. 10.

FIG. 11 shows the components of a feature detector array 1009. A total of W ($f_1$, $f_2$, . . . $f_w$) identical feature detectors 1101 receive input from the photoreceptor signals 1005. Each feature detector 1101 has M inputs. The case where M=3 is depicted in FIG. 11. The feature detectors 1101 are arranged so that the first feature detector 1101 ($f_1$) receives input from photoreceptor signals 1 through M, the second feature detector 1301 ($f_2$) receives input from photoreceptor signals 2 through M+1, and so forth. The outputs of the feature detectors 1101 generate the array of feature signals 1011 that comprises the feature detector array output.

Figure 12A:
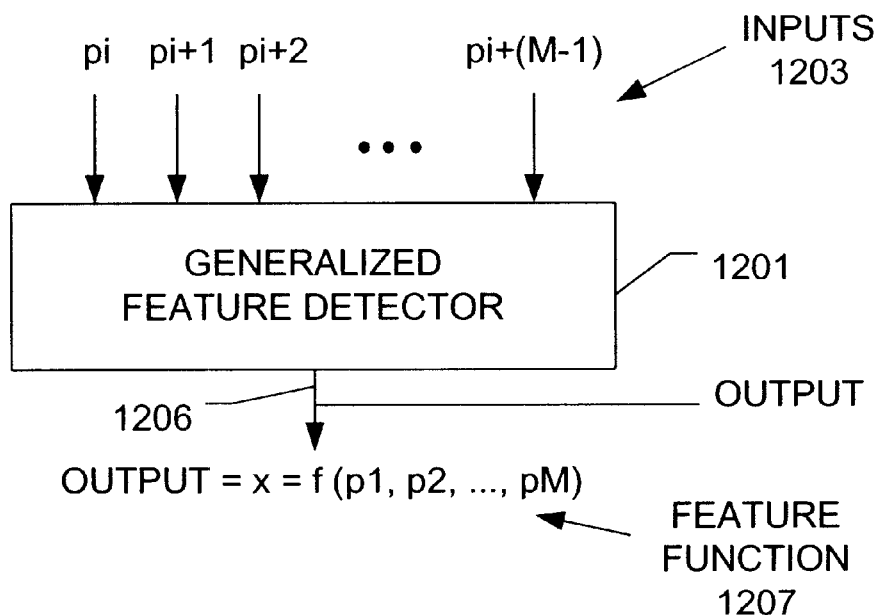
FIGS. 12A and 12B are block diagrams of a generalized feature detector and a linear feature detector, respectively, which can be employed in the feature detector array of FIG. 11.
Figure 12B:
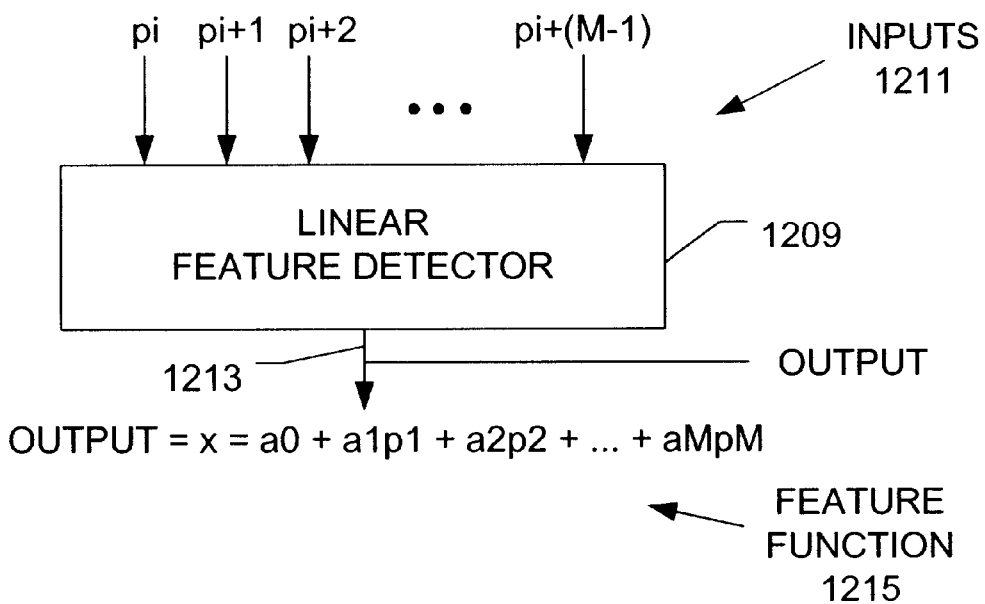

FIGS. 12A and 12B each depict an individual feature detector array and are taken directly from U.S. Pat. No. 6,020,953. FIG. 12A shows a generalized feature detector 1201 including M inputs 1203, an output 1205, and a feature function 1207 which is used to generate the output from the input thereon. FIG. 12B shows a linear feature detector 1209 including inputs 1211, output 1213, and feature function 1215. It will be understood that a linear feature detector is simply a feature detector whose feature function is a weighted sum of the inputs thereto. For the same reasons as described in U.S. Pat. No. 6,020,953, it is preferable to use such a linear feature detector with weights $a_O$ though $a_M$ that add up to zero. However, in principle, any feature detector can be used.

Although the invention has been described above in relation to preferred embodiments thereof, it Will be understood by those skilled in the art that variations and modifications can be effected in these preferred embodiments without departing from the scope and spirit of the invention.

What is claimed is:

1. An optic flow sensor comprising:
   a plurality of photoreceptors, said photoreceptors generating a plurality of photoreceptor signals;
   a plurality of feature detector arrays, each said feature detector array receiving as input said photoreceptor signals, and each said feature detector array generating a plurality of feature signals;
   a plurality of optic flow measuring circuits or algorithms, each said optic flow measuring circuit or algorithm receiving as input one said plurality of feature signals, and each said optic flow measuring circuit or algorithm generating an optic flow measurement signal, whereby said plurality of optic flow measuring circuits or algorithms generates a plurality of optic flow measurement signals; and a fusion circuit or algorithm receiving as input said optic flow measurement signals, and generating a final optic flow signal from said optic flow measurement signals, whereby said final optic flow signal is a robust measurement of the optic flow as seen by said photoreceptors.

2. A sensor according to claim 1 wherein each of said feature detector arrays generates a different feature signal from that generated by the others of said plurality of feature detector arrays.

3. A sensor according to claim 2 wherein at least one of said feature detector arrays comprises a plurality of edge detectors.

4. A sensor according to claim 3 wherein at least a further one of said feature detector arrays comprises a plurality of second derivative detectors.

5. A sensor according to claim 2 wherein at least one of said feature detector arrays comprises a plurality of second derivative detectors.

6. A sensor according to claim 2 wherein each of said feature detector arrays comprises a plurality of linear feature detectors.

7. A sensor according to claim 1 wherein said fusion circuit or algorithm comprises a leaky integrator circuit or leaky integrator algorithm.

8. A sensor according to claim 1 wherein said fusion circuit or algorithm determines the recent history of the optic flow measurement signals and computes a mean or median based thereon to generate said final optic flow signal.

9. A sensor according to claim 1 wherein said fusion circuit or algorithm determines a running average of the optical flow measurement signals to generate said final optic flow signal.

10. An optic flow sensor comprising:

a plurality of photoreceptors for generating a plurality of photoreceptors signals;

a plurality of feature detector arrays, each of said feature detector arrays receiving said photoreceptor signals and each of said feature detector arrays generating a plurality of feature signals based on said photoreceptor signals received thereby, each of said feature detector arrays generating a different feature signal from that generated by the others of said plurality of feature detector arrays;

a plurality of optic flow measuring means for receiving said feature signals, each said optic flow measuring means receiving as input one said plurality of feature signals and each said optic flow measuring means generating an optic flow measurement signal based on the variation over time of the respective feature signal received thereby, so that said plurality of optic flow measuring means generates a plurality of optic flow measurement signals; and a fusion means for receiving said optic flow measurement signals and for generating a final optic flow signal based on said optic flow measurement signals received thereby, said feature detector arrays being sufficiently different from one another that said optic flow measurement signals generated by said optic flow measuring means tend to have errors at different times.

11. A sensor according to claim 10 wherein said optic flow measuring means comprises an optic flow measuring circuit.

12. A sensor according to claim 10 wherein said optic flow measuring means comprises an optic flow measuring algorithm implemented by a computer.

13. A sensor according to claim 10 wherein at least one of said feature detector arrays comprises a plurality of edge detectors.

14. A sensor according to claim 13 wherein at least a further one of said feature detector arrays comprises a plurality of second derivative detectors.

15. A sensor according to claim 10 wherein at least one of said feature detector arrays comprises a plurality of derivative detectors.

16. A sensor according to claim 10 wherein each of said feature detector arrays comprises a plurality of linear feature detectors.

17. A sensor according to claim 10 wherein said fusion means comprises a leaky integrator circuit or leaky integrator algorithm.

18. A sensor according to claim 10 wherein said fusion means comprises a fusion circuit or algorithm which determines the recent history of the optic flow measurement signals and computes a mean or median based thereon to generate said final optic flow signal.

19. A sensor according to claim 10 wherein said fusion means comprises a fusion circuit or algorithm Which determines a running average of the optical flow measurement signals to generate said final optic flow signal.

20. An optic flow sensor comprising:

a plurality of elementary motion detectors placed on a visual field, each of the plurality of elementary motion detectors operative to provide motion and velocity measurements and each comprising an array of feature detectors and a transition detection speed measurement circuit; and a fusion circuit operative to receive the motion and velocity measurements from the plurality of elementary motion detectors, to identify erroneous measurements and to determine a final optic flow signal comprising motion and velocity measurements.

21. The optic flow sensor of claim 20, the final optic flow signal determined utilizing a majority voting scheme.

22. The optic flow sensor of claim 20, an array of feature detectors of a first elementary motion detector of the plurality of elementary motion detectors comprising edge detectors and an array of feature detectors of a second elementary motion detector of the plurality of elementary motion detectors comprising mexican hat detectors.

* * * * *